United States Patent [19]

Hijikata

[11] Patent Number: 5,475,402
[45] Date of Patent: Dec. 12, 1995

[54] DISPLAY CONTROL APPARATUS AND METHOD

[75] Inventor: Keijiro Hijikata, Tokyo, Japan

[73] Assignee: Kabushiki Kaisha Toshiba, Kawasaki, Japan

[21] Appl. No.: 399,344

[22] Filed: Mar. 6, 1995

Related U.S. Application Data

[63] Continuation of Ser. No. 70,769, Jun. 3, 1993, abandoned.

[30] Foreign Application Priority Data

Jun. 4, 1992 [JP] Japan .................................. 4-144214
Sep. 29, 1992 [JP] Japan .................................. 4-260098

[51] Int. Cl.⁶ .................................................. G09G 1/28
[52] U.S. Cl. .............................. 345/211; 345/199; 345/3
[58] Field of Search .......................... 345/211, 3, 199; 348/372; 364/707

[56] References Cited

U.S. PATENT DOCUMENTS

| | | |
|---|---|---|
| 4,195,431 | 4/1980 | Neufeld . |
| 4,317,181 | 2/1982 | Teza ........................................ 364/707 |
| 4,760,387 | 7/1988 | Ishii et al. . |
| 4,842,378 | 6/1989 | Flasck et al. . |
| 4,922,448 | 5/1990 | Kunieda et al. . |
| 4,926,166 | 5/1990 | Fujisawa et al. . |
| 4,945,335 | 7/1990 | Kimura et al. . |
| 4,980,678 | 12/1990 | Zenda . |
| 4,980,836 | 12/1990 | Carter et al. . |
| 4,998,100 | 3/1991 | Ishii ........................................ 345/3 |
| 5,196,839 | 3/1993 | Johary ................................ 345/208 |

FOREIGN PATENT DOCUMENTS

| | | |
|---|---|---|
| 190664 | 8/1986 | European Pat. Off. . |
| 326275 | 8/1989 | European Pat. Off. . |
| 2053533 | 2/1981 | United Kingdom . |

*Primary Examiner*—Curtis Kuntz
*Assistant Examiner*—Minsun Oh
*Attorney, Agent, or Firm*—Finnegan, Henderson, Farabow, Garrett & Dunner

[57] ABSTRACT

A display control apparatus comprises a control signal generator for generating various control signals including pixel video data and a display clock signal synchronous to the pixel video data, a flat-panel controller for driving a flat-panel display according to the control signals, a color palette RAM for color-converting the pixel video data supplied from the control signal generator into a digital RGB signal, and a video DAC for converting the digital RGB signal supplied from the color palette RAM into an analog RGB signal in response to the display clock signal supplied from the control signal generator to drive an analog color CRT display. Particularly, the control signal generator includes a power-down controller for supplying a power-down signal to the video DAC in response to data indicating a use of the flat-panel display, and performing a control of the display clock signal to complete a sequence of the digital-to-analog conversion which has been started at the time of supplying the power-down signal.

17 Claims, 6 Drawing Sheets

| TYPE OF DISPLAY | $\overline{RAMPD0}$ | $\overline{RAMPD1}$ | $\overline{DACPD}$ | RAM 60B | DAC 60C |
|---|---|---|---|---|---|
| ANALOG COLOR CRT | H | H | H | ON | ON |
| COLOR LCD | H | H | L | ON | POWER DOWN |
| MONOCHROME LCD | H | L | L | POWER DOWN | POWER DOWN |
| SUSPEND | L | L | L | POWER DOWN | POWER DOWN |

F I G. 6

F I G. 7

F I G. 8

DISPLAY CONTROL APPARATUS AND METHOD

This application is a continuation, of application Ser. No. 08/070,769, filed Jun. 3, 1993, now abandoned.

BACKGROUND OF THE INVENTION

1. Field of the Invention

This invention relates to a display control apparatus and method which provides display control of a flat-panel display and a CRT display in portable electronic equipment, and more particularly to a display control apparatus and method in which unnecessary power consumption is eliminated when the CRT display is not available.

2. Description of the Related Art

In recent years, the computer industry has seen enormous growth in the market for portable personal computers that are commonly referred to as notebook and subnotebook personal computers. Generally, such portable computers incorporate a flat-panel display, and are connectable to a CRT display. The flat-panel display is made up of a plasma display (PDP), an STN monochrome liquid-crystal display (LCD), an STN color LCD, a TFT color LCD, or the like.

Figure 1:
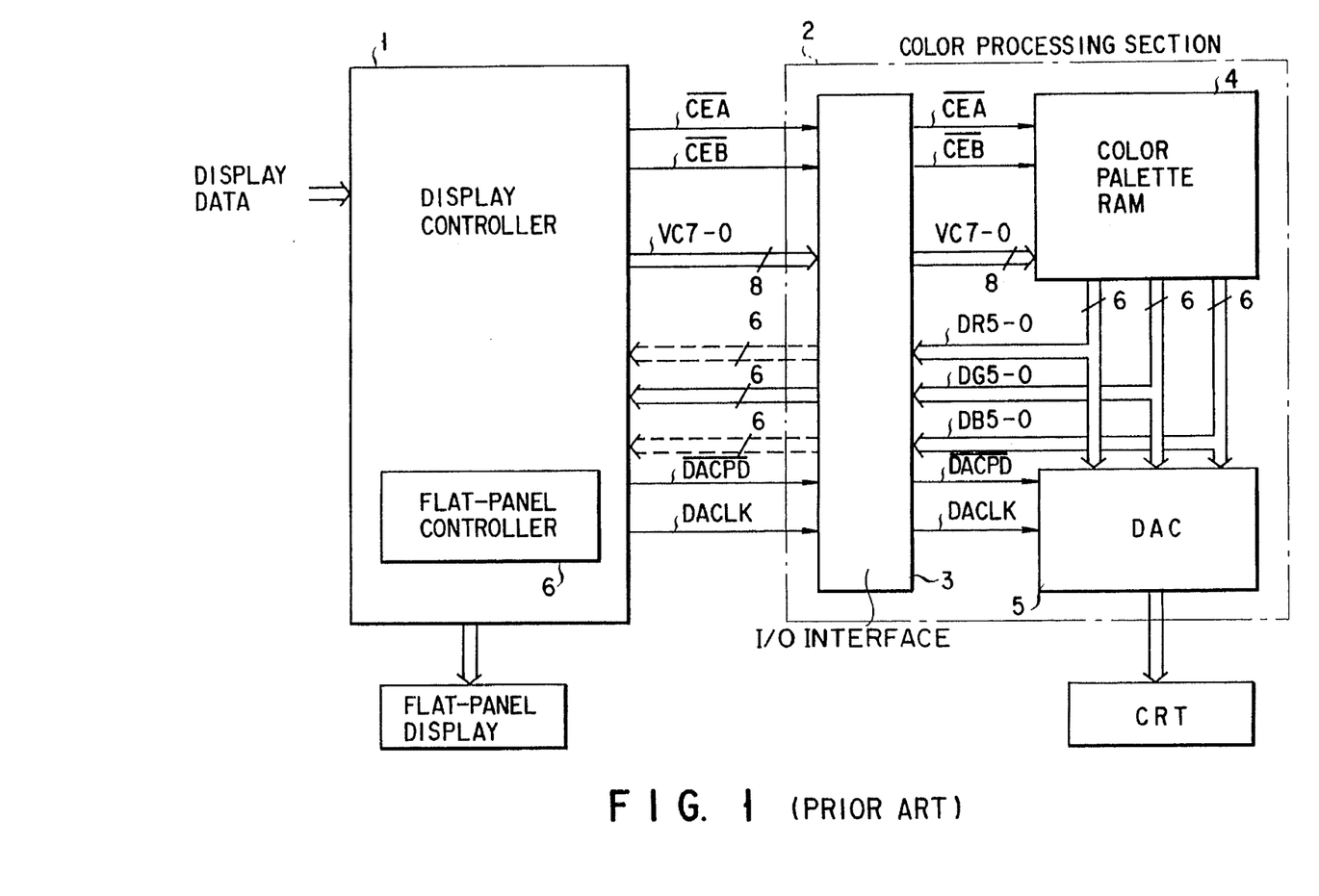
FIG. 1 is a block diagram showing the construction of a conventional display control apparatus.

FIG. 1 shows a conventional display control apparatus, which corresponds to, for example, a Model WD80C22 manufactured by Western Digital Corporation. This display control apparatus is provided with a display controller 1 that performs display control concerning an analog color CRT display and a flat-panel display, and a color processing section 2 that performs color processing to drive the analog color CRT display by the control of the display controller 1. In the display control, the display controller 1 produces various display control signals such as 8-bit pixel video data VC7-0 corresponding to a pixel of display data serially read out from a video RAM, and a display clock signal DACLK synchronous to the pixel video data VC7-0. The color processing section 2 includes an (I/O) interface 3 connected to the display controller 1, a color palette RAM 4 that color-converts the pixel video data VC7-0 supplied via the interface 3 into a digital RGB signal, and a video digital-to-analog converter (DAC) 5 that converts the digital RGB signal supplied from the color palette RAM 4 into an analog RGB signal. The color palette RAM 4 has 256 memory areas that each store palette data formed of a set of 6-bit color component data DR5-0, DG5-0, and DB5-0 representing red, green, and blue levels, respectively. It outputs as a digital RGB signal a set of color component data DR5-0, DG5-0, and DB5-0 stored in the memory area selected by pixel video data VC7-0. In the video DAC 5, the digital RGB signal is processed by a sequence of digital-to-analog conversion performed in synchronism with the display clock signal DACLK supplied from the input/output interface 3. Specifically, the video DAC 5 latches a digital RGB signal in a first clock cycle, converts the latched digital RGB signal into an analog RGB signal in a second clock cycle, and outputs the analog RGB signal in a third clock cycle. The input/output interface 3 supplies the color component data DR5-0, DG5-0, and DB5-0 of the digital RGB signal output from the color palette RAM 4 to the display controller 1. The display controller 1 contains a flat-panel controller 6 that drives a flat-panel display according to the color component data DR5-0, DG5-0, and DB5-0. When the flat-panel display is a monochrome LCD, however, only the color component data DG5-0 is used to drive the monochrome LCD. In this case, the color palette RAM 4 serves as a converter that performs tone-conversion on the pixel video data VC7-0.

When key-in operation is detected to be absent in the computer system for a preset period of time, the display controller 1 supplies a power-down signal $\overline{\text{DACPD}}$. For the video DAC 5 to the color processing section 2 to terminate the driving of the analog color CRT display. The video DAC 5 stops inputting of the digital RGB signal in response to the power-down signal $\overline{\text{DACPD}}$.

However, operation of the video DAC 5 cannot be resumed normally in a case where it has been suspended by cutting off the display clock signal DACLK at the time when the power-down signal $\overline{\text{DACPD}}$ is supplied. In this case, it is not certain that the video DAC 5 enters into the least power consuming state very close to the state of fully cutting off the power supply. Further, the flat-panel controller 6 drives the flat-panel display according to the digital RGB signal supplied from the color processing section 2. Therefore, it seems difficult to further reduce the power consumption in the color processing section 2 when only the flat-panel display is driven.

SUMMARY OF THE INVENTION

An object of the present invention is to provide a display control apparatus and method which can assure that operation of a video DAC is resumed normally from suspension when an analog color CRT display is used.

According to a first aspect of the present invention, there is provided a display control apparatus 10 which comprises a control signal generator for generating various control signals including pixel video data and a display clock signal synchronous to the pixel video data, a flat-panel controller for driving a flat-panel display according to the control signals, a color palette memory for color-converting the pixel video data supplied from the control signal generator into a digital RGB signal, and a digital-to-analog converter for converting the digital RGB signal supplied from the color palette memory into an analog RGB signal in response to the display clock signal supplied from the control signal generator to drive an analog color CRT display, wherein the control signal generator includes a power-down controller for supplying a power-down signal to the digital-to-analog converter in response to data indicating a use of the flat-panel display, and performing a control of the display clock signal to complete a sequence of the digital-to-analog conversion which has been started at the time of supplying the power-down signal.

According to a second aspect of the present invention, there is provided a display control method which comprises a step of generating various control signals including pixel video data and a display clock signal synchronous to the pixel video data, a step of driving a flat-panel display according to the control signals, a step of color-converting the pixel video data into a digital RGB signal by a color palette memory, a step of converting the digital RGB signal supplied from the color palette memory into an analog RGB signal in response to the display clock signal by a digital-to-analog converter to drive an analog color CRT display, and a step of supplying a power-down signal to the digital-to-analog converter in response to data indicating a use of the flat-panel display, and performing a control of the display clock signal to complete a sequence of the digital-to-analog conversion which has been started at the time of supplying the power-down signal.

With the display control apparatus and method, a power down signal is supplied to the digital-to-analog converter in response to data indicating a use of the flat-panel display. Further, a control of the display clock signal is performed to complete a sequence of the digital-to-analog conversion which has been started at the time of supplying the power-down signal. Therefore, the conversion sequence is not interrupted. This assures that the digital-to-analog converter enters into the least power consuming state very close to the state of fully cutting off the power supply.

Additional objects and advantages of the invention will be set forth in the description which follows, and in part will be obvious from the description, or may be learned by practice of the invention. The objects and 10 advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

A display control apparatus according to a first embodiment of the present invention will now be explained with reference to FIGS. 2 to 6. This display control apparatus is incorporated in, for example, a portable computer system shown in FIG. 2.

Figure 2:
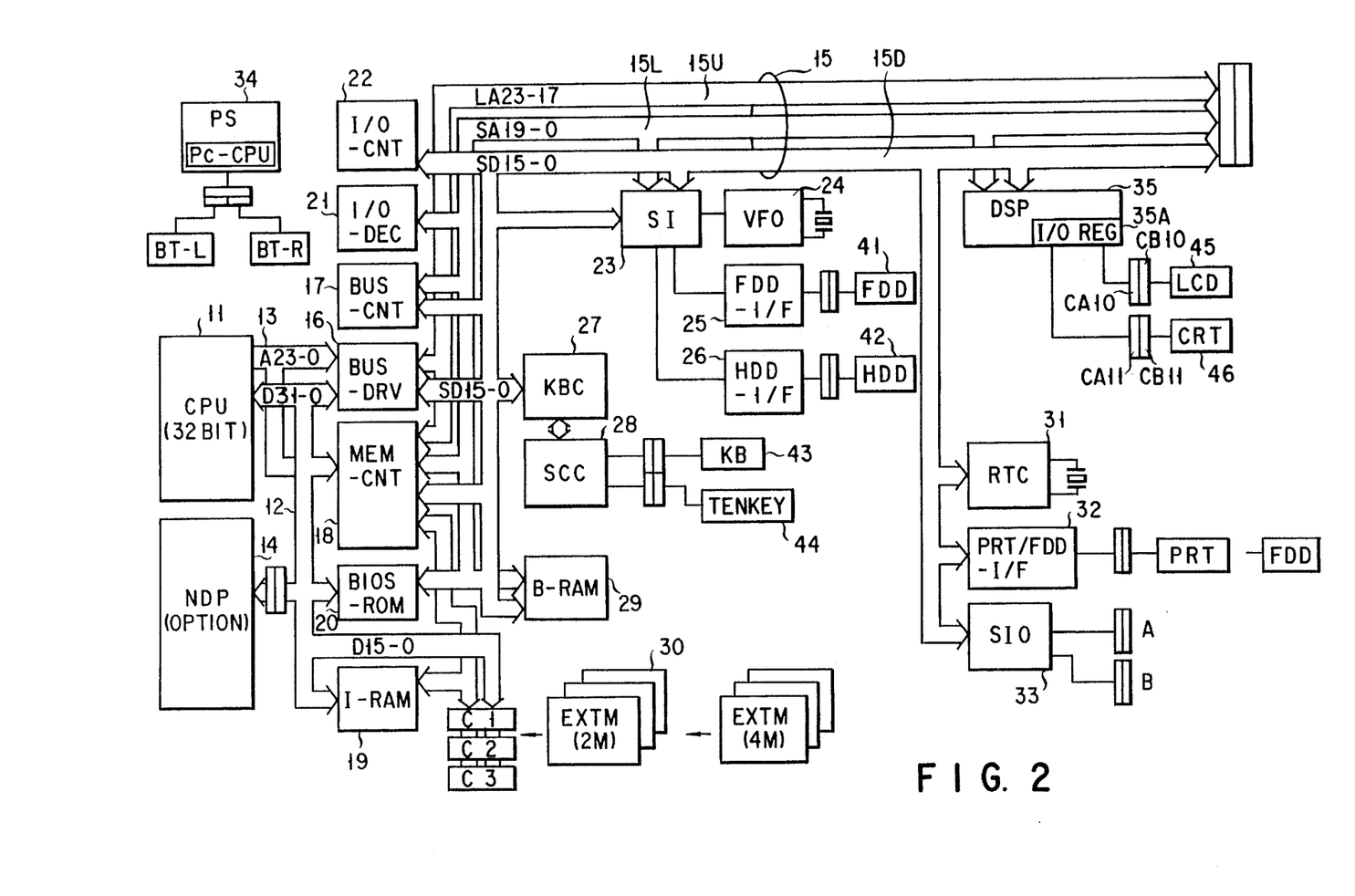
FIG. 2 is a general block diagram of a portable computer system which incorporates a display control apparatus according to a first embodiment of the present invention.

In FIG. 2, a central processing unit (CPU) 11 comprises a 32-bit CPU chip for example, which controls the entire operations of the display control system. The CPU 11 is connected to an internal data bus 12 of 32-bit width and an internal address bus 13 of 24-bit width. A numerical data processor 14 is optionally connected to the internal data bus 12 via a connector. A system bus 15 comprises a data bus 15D of 16-bit width, a lower address bus 15L of 20-bit width, and an upper address bus 15U of 7-bit width. A bus-driver 16 serves as an interface connecting the internal buses 12 and 13 to the system bus 15. A bus-controller 17 controls the system bus 15. A memory controller 18 controls transfer of addresses between the lower address bus 15L and the upper address bus 15U, and simultaneously controls data reading and writing operations of a main memory 19 formed of a dynamic RAM. A BIOS-ROM 20 stores a basic input and output system program (BIOS). The BIOS includes an initialization routine, a setup routine, a display auto off routine, and the like for the system. An input/output decoder 21 decodes an input/output address on the system bus 15 and then transmits the decoded address to the corresponding I/O chip. An input/output controller 22 controls input and output of data. A superintegration IC 23 incorporates a variety of I/O controllers such as floppy-disk controller, a hard-disk controller, a DMA controller, an interrupt controller, and the like. A floppy-disk drive unit 41 is incorporated in the computer system and connected to a floppy-disk interface 25. A hard-disk drive unit 42 is connected to a hard-disk interface 26. The interfaces 25 and 26 interface the drive units 41 and 42 with the superintegration IC 23, respectively. A frequency controller 24 generates clock pulses for the floppy-disk drive unit 41. A keyboard controller 27 is connected to the system bus 15 and a keyboard scan controller 28. The keyboard scan controller 28 is connected to a keyboard unit 43 and a numeric key pad 44. A backup RAM 29 is available for executing a resume function. An extension memory card 30 is optionally connected to extension memory card connectors C1 through C3. An input/output port 32 is connected to an I/O unit such as an external floppy-disk drive unit (FDD) and a printer (PRT). A serial input/output interface 33 is connected to an interface unit of RS232-C. An intelligent power supply unit 34 is connected to a pair of main batteries (BT-L and BT-R) to obtain power for the system operation. This power supply unit 34 incorporates a power control CPU (Pc-CPU) for controlling various operation power supplies. The respective power supply statuses are notified to the CPU 11 via the input/output controller 22. A clock module 31 incorporates a dedicated drive battery and a CMOS RAM backed up by this battery. The CMOS RAM stores configuration data of the computer system to be set in the initialization routine or the setup routine.

The computer system comprises a display control unit 35 connected to the system bus 15, as the display control apparatus. The display control unit 35 is includes a connector CA10 previously connected to a connector CB10 of a flat-panel display 45 (i.e., an STN monochrome LCD, an STN color LCD, or a TFT color LCD) and a connector CA11 connectable to an analog color CRT display 46 via an appropriate connector CB11. The connector CA10 is provided with sensor pins for sensing the type of the flat-panel display 45, and the connector CA11 is provided with sensor pins for sensing the connection of the analog color CRT display 46. Status data of the sensor pins from the connectors CA10 and CA11 are stored in an I/O register 35A. In the initialization routine, the CPU 11 reads the status data stored in the I/O register 35A to set display configuration data in the CMOS RAM in the clock module 31. The display configuration data includes C/M flag data indicating which one of a monochrome LCD and a color LCD is connected as the flat-panel display 45, CRT flag data indicating which one of the flat-panel display 45 and the CRT display 46 is selected to be used, and display-off flag data indicating a display auto off mode in which a selected display is disabled if key-in operation is absent in the computer system for a preset period of time. These CRT flag data and display-off flag data can be changed in the setup routine.

Figure 3:
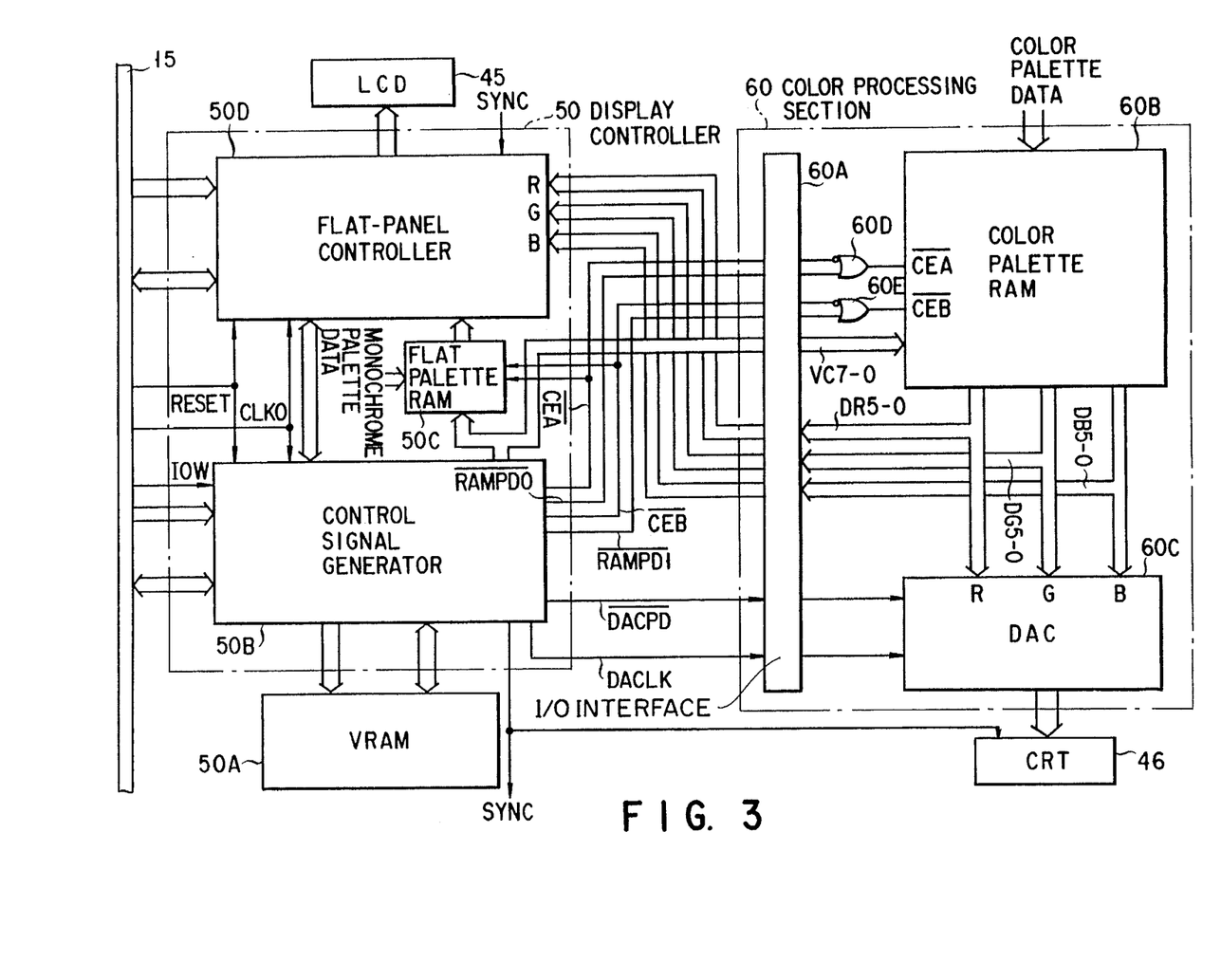
FIG. 3 is a block diagram showing the construction of the display control apparatus of FIG. 2.

FIG. 3 shows the construction of the display control unit 35. The display control unit 35 includes a display controller 50 that performs display control concerning a flat-panel display 45 and an analog color CRT display 46, and a color processing section 60 that performs color processing to drive the analog color CRT display 46 by the control of the display controller 50.

The display controller 50 includes a video RAM 50A that stores display data, a control signal generator 50B that accesses the video RAM 50A and generates various display control signals including 8-bit pixel video data VC7-0 representing a pixel of the display data in a serial form, and a display clock signal DACLK synchronous to the pixel video data VC7-0, a flat palette RAM 50C of a dual port type that performs tone-conversion on the pixel video data VC7-0, and a flat-panel controller 50D that drives the flat-panel display 45. The flat palette RAM 50C has 256 4-bit memory areas each of which stores 4-bit palette data representing a tone level, and outputs the palette data stored in a memory area selected by the pixel video data VC7-0 as a monochrome signal. Writing and reading of the palette data are enabled by first and second chip enable signals $\overline{CEA}$ and $\overline{CEB}$ supplied to the flat palette RAM 50C, respectively. When the flat-panel display 45 is a monochrome LCD, the flat-panel controller 50D drives the monochrome LCD according to the monochrome signal from the flat palette RAM 50C.

The color processing section 60 includes an input/output interface 60A connected to the display controller 50, a color palette RAM 60B of a dual port type that performs color-conversion on the pixel video data VC7-0 supplied via the input/output interface 60A to produce a digital RGB signal, and a video digital-to-analog converter (DAC) 60C that converts the digital RGB signal to an analog RGB signal. The color palette RAM 60B has 256 18-bit memory areas each of which stores palette data constituted by a set of 6-bit color component data DR5-0, DG5-0, and DB5-0 representing red, green, and blue levels, respectively. The color palette RAM 60B outputs the palette data stored in a memory area selected by the pixel video data VC7-0 as the digital RGB signal. Writing and reading of the palette data are enabled by first and second chip enable signals $\overline{CEA}$ and $\overline{CEB}$ supplied to the color palette RAM 60B, respectively. In the video DAC 60C, the digital RGB signal is processed by a sequence of digital-to-analog conversion performed in synchronism with the display clock signal DACLK supplied via the input/output interface 60A. More specifically, the video DAC 60C latches the digital RGB signal in a first clock cycle, converts the latched signal to an analog RGB signal in a second clock cycle, and outputs the analog RGB signal in a third clock cycle. Further, the input/output interface 60A supplies the digital RGB signal (i.e., the color component data DR5-0, DG5-0, and DB5-0) output from the color palette RAM 60B to the flat-panel controller 50D of the display controller 50. When the flat-panel display 45 is a color LCD, the flat-panel controller 50D drives the color LCD according to the digital RGB signal.

Figure 4:
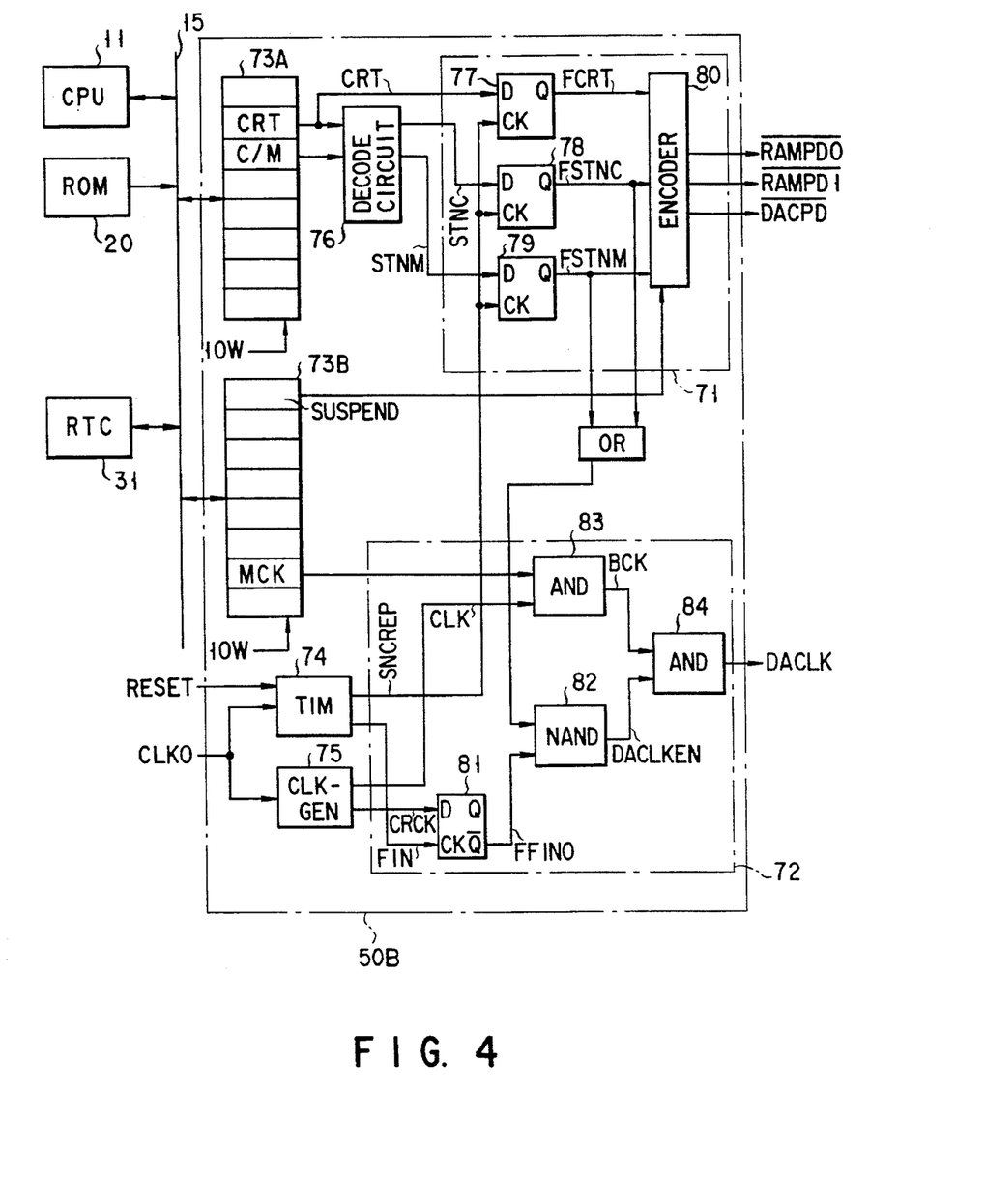
FIG. 4 is a block diagram showing the detailed construction of a part of the control signal generator in the display control apparatus of FIG. 3.
Figure 5:
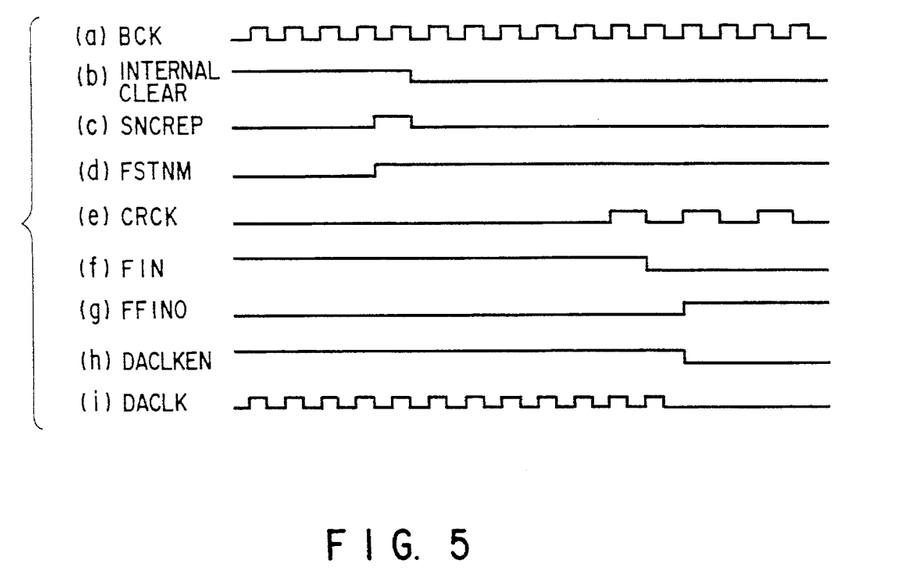
FIG. 5 is a timing chart for the signals produced by the control signal generator of FIG. 4.

FIG. 4 shows the detailed construction of a part of the control signal generator 50B, and FIG. 5 shows a timing chart for the various signals produced by the control signal generator 50B.

The control signal generator 50B includes an 8-bit control register 73A that stores display configuration data supplied in the initialization routine, an 8-bit control register 73B that stores clock control data supplied in the display auto off routine, a decode circuit 76 that decodes two specified bits (i.e., the seventh bit and the sixth bit) of the control register 73A, a power-down controller 71 that performs power-down control for the color palette RAM 60B and the video DAC 60C, a timing generator 74 that generates various internal timing control signals from a basic clock signal CLK0, a clock generator 75 that generates various internal clock signals from the basic clock signal CLK0, and a clock controller 72 that generates a display clock signal DACLK to be supplied to the video DAC 60C. The above-mentioned internal timing control signals include an internal clear cancel timing signal SNCREP, a frame start timing signal SNCREP FIN, and other timing signals. The internal clear cancel timing signal is generated after the elapse of a preset internal clear period from the time when a reset signal for the display control unit 35 is supplied in the initialization routine. The frame start timing signal FIN is generated to define the start timing of a display cycle for the first frame after a preset period has elapsed from the generation of the internal clear cancel timing signal. The above-mentioned internal clock signals include a character display clock signal CRCK, a clock signal CLK having a frequency which defines that of the display clock signal DACLK, and other clock signals. The display configuration data and the clock control data are latched by the control registers 73A and 73B at the time when an I/O write signal IOW is supplied from the input/output decoder 21.

The seventh and sixth bits of the control register 73A store the CRT flag data and C/M flag data included in the display configuration data, respectively. The eighth and second bits of the control register 73B store display drive flag data indicating whether the display operation should be enabled or not, and clock supply data indicating whether the clock supply should be enabled or not, respectively. The CRT flag data "1" is supplied to the power-down controller 71 and the decode circuit 76, as a CRT display mode signal CRT. The decode circuit 76 supplies a color LCD display mode signal STNC to the power-down controller 71 in response to the combination of the CRT flag data "0" and the C/M flag data "1", and a monochrome LCD display mode signal STNM in response to the combination of the CRT flag data "0" and the C/M flag data "0". When it is detected in the display auto off mode that key-in operation is absent for a preset period of time, the display drive flag data "0" is set in the control register 73B during an I/O write cycle, and then the clock supply flag data "0" is set in the control register 73B during an I/O write cycle subsequent to the I/O write cycle during which the drive flag data "0" is set. The display drive flag data "0" is supplied to the power-down controller 71 as a display off signal SUSPEND, and the clock supply flag data "0" is supplied to the clock controller 72 as a clock disable signal MCK.

The power-down controller 71 is composed of flip-flops 77, 78, and 79 to which the display mode signals CRT, STNC, and STNM are selectively supplied, and an encoder 80 that produces power-down control signals $\overline{RAMPDO}$, $\overline{RAMPDI}$, and $\overline{DACPD}$ according to the display mode detected by the flip-flops 77, 78, and 79. The display mode signals CRT, STNC, and STNM are latched by the flip-flops 77, 78, and 79 in response to the internal clear cancel timing signal SNCREP, and supplied to the encoder 80 as latched display mode signals FCRT, FSTNC, and FSTNM. When the display mode signal FCRT is supplied to the encoder 80, the power-down control signals $\overline{RAMPDO}$, $\overline{RAMPDI}$, and $\overline{DACPD}$ rise. When the display mode signal FSTNC is supplied to the encoder 80, the power-down control signals $\overline{RAMPDO}$ and $\overline{RAMPDI}$ rise and the signal $\overline{DACPD}$ falls. When the display mode signal FSTNM is supplied to the encoder 80, the power-down control signal $\overline{RAMPDO}$ rises and the control signals $\overline{RAMPDI}$ and $\overline{DACPD}$ fall. All the power-down control signals $\overline{RAMPDO}$, $\overline{RAMPDI}$, and $\overline{DACPD}$ fall when the display off signal SUSPEND is supplied to the encoder 80. The power-down control signals $\overline{\text{RAMPD0}}$ and $\overline{\text{RAMPD1}}$ are respectively supplied to OR gates 60D and 60E which control supply of the first and second chip enable signals $\overline{\text{CEA}}$ and $\overline{\text{CEB}}$ between the interface 60A and the color palette RAM 60B. The power-down control signal $\overline{\text{DACPD}}$ is supplied to the video DAC 60C. The OR gate 60D inhibits supply of the first chip enable signal $\overline{\text{CEA}}$ when the power-down control signal $\overline{\text{RAMPD0}}$ is fallen, the OR gate 60E inhibits supply of the second chip enable signal $\overline{\text{CEB}}$ when the power-down control signal RAMPD1 is fallen.

The clock controller 72 includes a flip-flop 81, a NAND circuit 82, an AND circuit 83, and an AND circuit 84. The flip-flop 81 receives the character display clock signal CRCK to generate an inverted output signal FFINO which rises in synchronism with the frame start timing signal FIN. The NAND circuit 82 supplies a display clock enable signal DACLKEN when neither the display mode signal FSTNC nor FSTNM is supplied, and stops the signal supply in response to a rise of the inverted output signal FFINO when either the display mode signal FSTNC or FSTNM is supplied via an OR circuit from a corresponding one of the flip-flops 78 and 79. The AND circuit 83 outputs the clock signal CLK as a clock signal BCK, except when the clock disable signal MCK is not supplied from the control register 73B. The AND circuit 84 outputs the clock signal BCK as the display clock signal DACLK, except when the display clock enable signal DACLKEN is not supplied.

Figure 6:
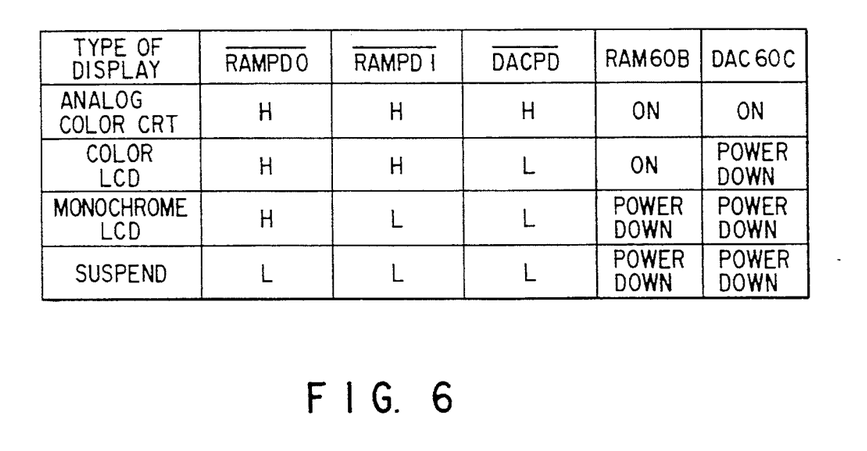
FIG. 6 is a diagram for explaining power-down control based on the type of display.

The power-down control of the display control unit 35 is described with reference to FIG. 6.

In the initialization routine, a reset signal is supplied to the display control unit 35. Upon supply of the reset signal, an internal clear sequence is started for the display controller 50. The control registers 73A and 73B are initialized during the internal clear period succeeding to the supply of the reset signal. In this initialization, the CPU 11 checks the contents of the CMOS RAM in the clock module 31, and sets display configuration data and clock control data in the control registers 73A and 73B, respectively. If the display selection should be changed, the setup routine is executed to update the contents of the CMOS RAM in the clock module 31, and then the initialization routine is executed.

When an analog color CRT display is selected to be used, CRT flag data "1" and C/M flag data "0" are set in the control register 73A, and display drive flag data "1" and clock supply flag data "1" are set in the control register 73B. At this time, the CRT flag data "1" is output from the control register 73A as a display mode signal CRT, the decode circuit 76 does not output a display mode signal STNC or STNM. When an internal clear cancel timing signal SNCREP is supplied to the flip-flops 77, 78, and 79, the display mode signal CRT is latched by the flip-flop 77, and supplied to the encoder 80 as a display mode signal FCRT. The control register 73B does not output a display off signal SUSPEND, while the display drive flag data "1" is set 10 therein. Therefore, as shown in FIG. 6, the encoder 80 produces power-down control signals $\overline{\text{RAMPD0}}$, $\overline{\text{RAMPD1}}$, and $\overline{\text{DACPD}}$ having levels of "H", "H", and "H", respectively. At this time, the OR gates 60D and 60E set the color palette RAM 60B into the ON state where data writing and reading operations are enabled in response to first and second enable signals $\overline{\text{CEA}}$ and $\overline{\text{CEB}}$. On the other hand, the video DAC 60C performs digital-to-analog conversion in synchronism with a display clock signal DACLK.

The display clock signal DACLK is obtained as described below. The AND circuit 83 outputs the clock signal CLK supplied from the clock generator 75 as a clock signal BCK, while the clock supply flag data "1" is set in the control register 73B. The NAND circuit 82 outputs a display clock enable signal DACLKEN irrespective of the inverted output signal FFINO of the flip-flop 81, while neither a display mode signal FSTNC nor FSTNM is supplied thereto. The AND circuit 84 outputs the clock signal BCK supplied from the AND circuit 83 as the display clock signal DACLK.

When a color LCD is selected to be used, CRT flag data "0" and C/M flag data "1" are set in the control register 73A, and display drive flag data "1" and clock supply flag data "1" are set in the control register 73B. At this time, a display mode signal CRT is not output from the control register 73A, and the decode circuit 76 outputs a display mode signal STNC. When an internal clear cancel timing signal SNCREP is supplied to the flip-flops 77, 78, and 79, the display mode signal STNC is latched by the flip-flop 78, and supplied to the encoder 80 as a display mode signal FSTNC. The control register 73B does not output a display off signal SUSPEND, while the display drive flag data "1" is set therein. Therefore, as shown in FIG. 6, the encoder 80 produces power-down control signals $\overline{\text{RAMPD0}}$, $\overline{\text{RAMPD1}}$, and $\overline{\text{DACPD}}$ having levels of "H", "H", and "L", respectively. At this time, the OR gates 60D and 60E set the color palette RAM 60B into the ON state where data writing and reading operations are enabled in response to first and second enable signals CEA and CEB. On the other hand, the video DAC 60C continues a sequence of digital-to-analog conversion which has been started at the time when the power-down control signal $\overline{\text{DACPD}}$ is fallen, and enters into the power-down state after the display clock signal DACLK is cut off.

The display clock signal DACLK is cut off as described below. The AND circuit 83 outputs the clock signal CLK supplied from the clock generator 75 as a clock signal BCK, while the clock supply flag data "1" is set in the control register 73B. The flip-flop 81 latches the character display clock signal CRCK in response to a start timing signal FIN supplied from the timing generator 74 after the elapse of the internal clear period to output an inverted output signal FFINO. This signal FFINO rises in the second clock cycle of the character display clock signal CRCK, as shown in FIG. 5. Since the display mode signal FSTNC is supplied from the flip-flop 78, the NAND circuit 82 outputs a display clock enable signal DACLKEN until the rise of the inverted output signal FFINO, and stops outputting of the enable signal DACLKEN thereafter. The AND circuit 84 outputs the clock signal BCK supplied from the AND circuit 83 as the display clock signal DACLK until supply of the enable signal DACLKEN is stopped, and stops outputting of the display clock signal DACLK thereafter.

When a monochrome LCD is selected to be used, CRT flag data "0" and C/M flag data "0" are set in the control register 73A, and display drive flag data "1" and clock supply flag data "1" are set in the control register 73B. At this time, a display mode signal CRT is not output from the control register 73A, and the decode circuit 76 outputs a display mode signal STNM. When an internal clear cancel timing signal SNCREP is supplied to the flip-flops 77, 78, and 79, the display mode signal STNM is latched by the flip-flop 79, and supplied to the encoder 80 as a display mode signal FSTNM. The control register 73B does not output a display off signal SUSPEND, while the display drive flag data "1" is set therein. Therefore, as shown in FIG. 6, the encoder 80 produces power-down control signals $\overline{\text{RAMPD0}}$, $\overline{\text{RAMPD1}}$, and $\overline{\text{DACPD}}$ having levels of "H", "L", and "L", respectively. At this time, the OR gates 60D and 60E set the color palette RAM 60B into the power-down state where data writing operation is enabled in response to a first enable signal $\overline{\text{CEA}}$, but data reading operation is not enabled in response to a second enable signal $\overline{\text{CEB}}$. On the other hand, the video DAC 60C continues a sequence of digital-to-analog conversion which has been started at the time when the power-down control signal $\overline{\text{DACPD}}$ is fallen, and enters into the power-down state after the display clock signal DACLK is cut off.

The display clock signal DACLK is cut off as described below. The AND circuit 83 outputs the clock signal CLK supplied from the clock generator 75 as a clock signal BCK, while the clock supply flag data "1" is set in the control register 73B. The flip-flop 81 latches the character display clock signal CRCK in response to a start timing signal FIN supplied from the timing generator 74 after the elapse of the internal clear period to output an inverted output signal FFINO. This signal FFINO rises in the second clock cycle of the character display clock signal CRCK, as shown in FIG. 5. Since the display mode signal FSTNM is supplied from the flip-flop 79, the NAND circuit 82 outputs a display clock enable signal DACLKEN until the rise of the inverted output signal FFINO, and stops outputting of the enable signal DACLKEN thereafter. The AND circuit 84 outputs the clock signal BCK supplied from the AND circuit 83 as the display clock signal DACLK until supply of the enable signal DACLKEN is stopped, and stops outputting of the display clock signal DACLK thereafter.

When it is detected in the display auto off routine that a preset period of time has elapsed without key-in operation, display drive flag data "0" and clock supply flag data "1" are set in the control register 73B in one I/O write cycle, and display drive flag data "0" and clock supply flag data "0" are set in the control register 73B in a subsequent I/O write cycle. The control register 73B supplies a display off signal SUSPEND from the time when the display drive flag data "0" is set in the one I/O write cycle. In response to the display off signal SUSPEND, the encoder 80 produces power-down control signals $\overline{\text{RAMPD0}}$, $\overline{\text{RAMPD1}}$, and $\overline{\text{DACPD}}$ having levels of "L", "L", and "L", respectively. At this time, the OR gates 60D and 60E set the color palette RAM 60B into the power-down state where data writing and reading operations are not enabled in response to first and second enable signals $\overline{\text{CEA}}$ and $\overline{\text{CEB}}$. In the CRT display mode, the video DAC 60C continues a sequence of digital-to-analog conversion which has been started at the time when the power-down control signal $\overline{\text{DACPD}}$ is fallen, and enters into the power-down state after the display clock signal DACLK is cut off. 10 The display clock signal DACLK is cut off as described below. In the one I/O write cycle, a clock disable signal MCK is not supplied from the control register 73B to the AND circuit 83. Therefore, the AND circuit 83 outputs the clock signal CLK supplied from the clock generator 75 as a clock signal BCK. The AND circuit 84 responds to the display clock enable signal DACLKEN from the NAND circuit 82 and outputs the clock signal BCK as the display clock signal DACLK. When a clock disable signal MCK is supplied from the control register 73B to the AND circuit 83 in the subsequent I/O write cycle, the AND circuits 83 and 84 stops outputting of the clock signal BCK and the display clock signal DACLK, respectively.

According to the embodiment described above, the video DAC 60C is set in the power-down state in a display mode where the optional CRT display 46 is not used. The display clock signal DACLK is cut off with a delay for several tens of clock cycles, after the fall of the power-down control signal $\overline{\text{DACPD}}$. The video DAC 60C correctly completes a conversion sequence which has been started at the time when the fall of the power-down control signal $\overline{\text{DACPD}}$, by three clock cycles. Since the conversion sequence is not interrupted, the video DAC 60C reliably enters into the least power consuming state very close to the state of fully cutting off the power supply. Further, since the flat palette RAM 50C requires a less amount of memory capacity than the color palette RAM 60B, the power consumption can be more reduced. In addition, the display control described above can be effected by using existing general-purpose elements. Therefore, the manufacturing cost can be kept low.

Figure 7:
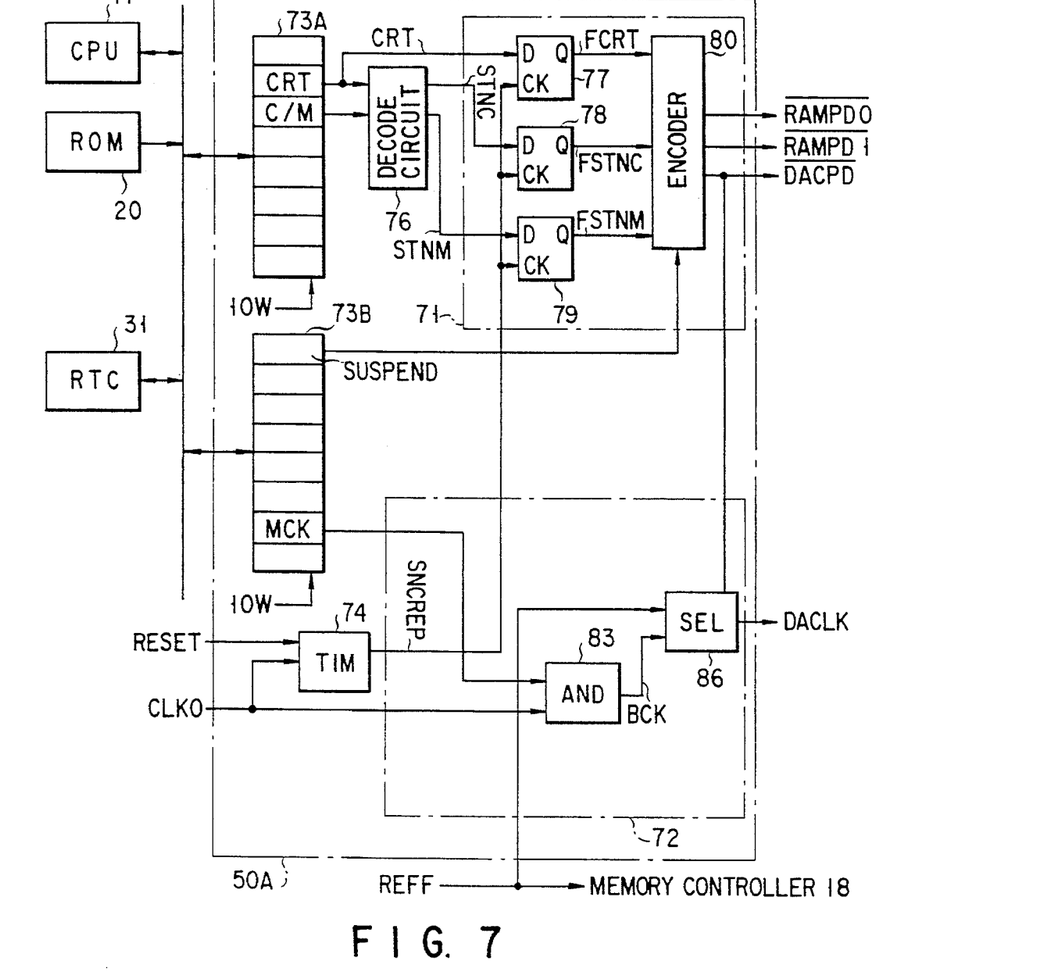
FIG. 7 is a block diagram showing the detailed construction of a part of the control signal generator in a display control apparatus according to a second embodiment of the present invention.
Figure 8:
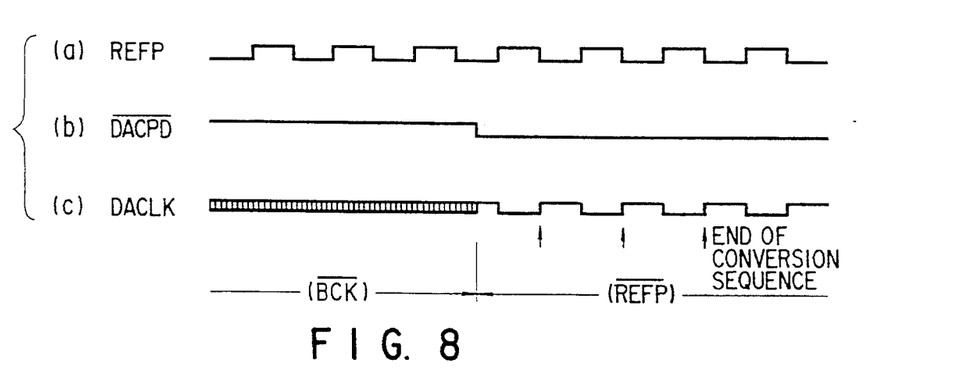
FIG. 8 is a timing chart for the signals produced by the control signal generator of FIG. 7.

A display control apparatus according to a second embodiment of the present invention will now be explained with reference to FIGS. 7 and 8. FIG. 7 shows the detailed construction of a part of the control signal generator in the display control apparatus, and FIG. 8 shows a timing chart for signals generated in the control signal generator.

The display control apparatus is incorporated, for example, in the portable computer system shown in FIG. 2, and has the same construction as that in the first embodiment except for the following points. For the sake of simplicity, redundant explanations are omitted and similar portions are indicated by the same reference numerals in the drawings.

The clock controller 72 of this apparatus does not have the flip-flop 81, the NAND circuit 82, and the AND circuit 84 provided in the first embodiment. Instead, a selector 86 is provided to select one of a memory refresh signal REFF and the clock signal BCK supplied from the AND circuit 83 and supply the selected signal to the video DAC 60C as the display clock signal DACLK. 10 The memory refresh signal REFF is a signal supplied to the memory controller 18 so as to refresh dynamic RAMs in the computer system, and has a significantly low frequency in comparison with the clock signal BCK. The selector 86 outputs the clock signal BCK until the power-down control signal $\overline{\text{DACPD}}$ falls, and the memory refresh signal REFF after the fall of the power-down control signal $\overline{\text{DACPD}}$.

According to the second embodiment, the display clock signal DACLK is switched from the clock signal BCK to the memory refresh signal REFF in response to the fall of the power-down control signal $\overline{\text{DACPD}}$. Therefore, the video DAC 60C completes a conversion sequence by three clock cycles after the power-down control signal $\overline{\text{DACPD}}$ has fallen. Since the frequency of the memory refresh signal REFF is significantly lower than the clock signal BCK, the video DAC 60C can reliably enter into the power-down state of the least power consumption as in the same manner as the case where the display clock signal DACLK is cut off. Further, since the circuit components other than the clock controller 72 have the same construction as those of the first embodiment, the power consumption of this display control apparatus can be reduced by setting the color palette RAM in the power-down state.

In each embodiment, various modifications can be made without departing from the scope of the present invention. For example, the flip-flops 77, 78, and 79 of the power-down controller 71 can be eliminated by using an encoder that operates in response to the internal clear cancel timing signal SNCREP. Further, the construction of the clock controller 72 can be changed if at least three clock pulses are additionally generated therefrom as the display clock signal DACLK after the power-down control signal $\overline{\text{DACPD}}$ has fallen.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A display control system including a flat-panel display and a connector for optionally connecting an analog color CRT display, said display control system comprising:

control signal generating means for generating various control signals including pixel video data and a display clock signal synchronous to the pixel video data;

flat-panel control means for driving said flat-panel display according to said various control signals;

color palette memory means for color-converting the pixel video data supplied from said control signal generating means into a digital RGB signal;

digital-to-analog converting means for converting the digital RGB signal supplied from said color palette memory means into an analog RGB signal in response to the display clock signal supplied from said control signal generating means to drive said analog color CRT display; and power-down control means, included in the control signal generating means, for supplying a power-down signal to the digital-to-analog converting means in response to data indicating no use of the analog color CRT display, and for controlling the display clock signal to permit the digital-to-analog converting means to complete a sequence of converting the digital RGB signal into the analog RGB signal which had been started at the time of supplying the power-down signal.

2. A display control system according to claim 1, wherein said power-down control means includes clock control means for supplying a preset number of clock signals required for completing the digital-to-analog conversion sequence after the supply of the power-down signal.

3. A display control system according to claim 2, wherein said clock control means includes clock cutting-off means for cutting off the display clock signal with a delay for a preset number of clock cycles.

4. A display control apparatus according to claim 1, wherein said power-down control means includes frequency changing means for lowering the frequency of said display clock signal from that synchronous with the pixel video data.

5. A display control system according to claim 4, wherein said frequency changing means includes clock switching means for switching said display clock signal to a low-frequency signal externally generated, after supply of the power-down signal.

6. A display control system according to claim 5, wherein said clock switching means includes signal receiving means for receiving a refresh signal for dynamic RAMs as said low-frequency signal.

7. A display control system according to claim 1, wherein said flat-panel control means includes means for tone-converting the pixel video data to a monochrome signal, and said control signal generating means includes power-down control means for supplying a power-down signal to said color palette memory means in response to data indicating a use of a monochrome display.

8. A display control system which comprises a flat-panel display, and to which an analog color CRT display can be arbitrarily connected, each of said display being operable to display applied data, said display control system comprising:

control signal generating means for generating various control signals including pixel video data and a display clock signal synchronous to the pixel video data;

flat-panel control means for driving the flat-panel display according to said control signals;

color palette memory means for color-converting the pixel video data supplied from said control signal generating means into a digital RGB signal;

digital-to-analog converting means for converting the digital RGB signal supplied from said color palette memory means into an analog RGB signal in response to the display clock signal supplied from said control signal generating means to drive the analog color CRT display; and power-down control means for supplying a power-down signal to the digital-to-analog converting means in response to data indicating no use of the analog color CRT display, and for disabling the supply of said display clock signal after a preset number of the display clock signals required for completing a digital-to-analog conversion sequence are supplied to said digital-to-analog converting means.

9. A display control system which comprises a flat-panel display, and to which an analog color CRT display can be arbitrarily connected, each of said display being operable to display applied data, said display control system comprising:

control signal generating means for generating various control signals including pixel video data and a display clock signal synchronous to the pixel video data;

flat-panel control means for driving the flat-panel display according to said control signals;

color palette memory means for color-converting the pixel video data supplied from said control signal generating means into a digital RGB signal;

digital-to-analog converting means for converting the digital RGB signal supplied from said color palette memory means into an analog RGB signal in response to the display clock signal supplied from said control signal generating means to drive the analog color CRT display; and power-down control means for supplying a power-down signal to the digital-to-analog converting means in response to data indicating no use of the analog color CRT display, and for lowering the frequency of said display clock signal from that synchronous to the pixel video data after supplying a power-down signal to the digital-to-analog converting means.

10. A display control system which comprises a flat-panel display, and to which an analog color CRT display can be arbitrarily connected, each of said display being Operable to display applied data, said display control system comprising:

control signal generating means for generating various control signals including pixel video data and a display clock signal synchronous to the pixel video data;

flat-panel control means for driving the flat-panel display according to said control signals;

color palette memory means for color-converting the pixel video data supplied from said control signal generating means into a digital RGB signal;

digital-to-analog converting means for converting the digital RGB signal supplied from said color palette memory means into an analog RGB signal in response to the display clock signal supplied from said control signal generating means to drive the analog color CRT display; and power-down control means for supplying a power-down signal to said color palette memory means in response to data indicating a use of a monochrome display; wherein said flat-panel control means includes a means for tone-converting the pixel video data to a monochrome signal.

11. A display control method comprising steps of:

generating various control signals including pixel video data and a display clock signal synchronous to the pixel video data;

driving a flat-panel display according to said control signals;

color-converting the pixel video data into a digital RGB signal by color palette memory means;

converting the digital RGB signal supplied from said color palette memory means into an analog RGB signal in response to the display clock signal by a digital-to-analog converting means to drive an analog color CRT display; and supplying a power-down signal to said digital-to-analog converting means in response to data indicating no use of the CRT display, and performing a control of the display clock signal to complete a sequence of the digital-to-analog conversion which has been started at the time of supplying the power-down signal.

12. A display control method according to claim 11, wherein said supplying and performing step includes a step of supplying a preset number of clocks required for completing the digital-to-analog conversion sequence after the supply of the power-down signal.

13. A display control method according to claim 12, wherein said clock supplying means includes a step of cutting off the display clock signal with a delay for a preset number of clock cycles.

14. A display control method according to claim 11, wherein said supply and performing step includes a step of lowering the frequency of said display clock signal from that synchronous to the pixel video data.

15. A display control method according to claim 14, wherein said frequency lowering step includes a step of switching said display clock signal to a low-frequency signal externally generated, after supply of the power-down signal.

16. A display control method according to claim 15, wherein said signal switching step includes a step of receiving a refresh signal for dynamic RAMs as said low-frequency signal.

17. A display control method according to claim 11, wherein said flat-panel display driving step includes a step of tone-converting the pixel video data to a monochrome signal by flat palette memory means, and said method further comprising a step of supplying a power-down signal to said color palette memory means in response to data indicating a use of a monochrome display.

* * * * *